UNITED STATES PATENT OFFICE.

CARLETON ELLIS, OF MONTCLAIR, NEW JERSEY.

FOOD PRODUCT CONTAINING HYDROGENATED OIL.

1,390,689.   Specification of Letters Patent.   Patented Sept. 13, 1921.

No Drawing. Original application filed December 23, 1913, Serial No. 808,461. Divided and this application filed October 2, 1916. Serial No. 123,416.

*To all whom it may concern:*

Be it known that I, CARLETON ELLIS, a citizen of the United States, residing at Montclair, in the county of Essex and State of New Jersey, have invented certain new and useful Improvements in Food Products Containing Hydrogenated Oil, of which the following is a specification.

The present invention relates to products obtained by hydrogenating fatty oils, and to mixtures of two or more of such products, or to mixtures of such products with unsaturated fats or oils. The present application is a division of my co-pending application 808,461, filed December 23, 1913.

By treatment of unsaturated fats and oils, such as tallow, oleostearin, cotton, corn, rape, peanut, castor, linseed, Chinese wood, fish, whale and similar oils with hydrogen and the like in the presence of a suitable catalyzer a hardening of the oil results through formation of stearins and other solid bodies.

The catalyst employed may be nickel, copper, cobalt, palladium, platinum, or their oxids, or mixtures thereof, or other suitably active catalyst such for example as those described in my Patent Numbers 1,026,156; 1,047,013; 1,052,469; 1,078,541; 1,084,202; 1,084,258; or reissue 14,429, or other suitable catalyst.

In making lard compound I may take a hydrogenated oil as cottonseed oil having a melting point of about 54–58° C. or higher and mix same with deodorized cottonseed oil using about 10% or so of the hydrogenated oil and about 90% of the normal cottonseed oil. The hydrogenated oil may be melted and incorporated with the cottonseed oil at any suitable temperature, but preferably at a temperature only slightly above the melting point of the mixture. The composition may then be chilled as by passing over a chill rool or beating in a brine cooled receptacle. The product may be somewhat aerated to improve its color. It should then preferably be allowed to nature, that is to stand for a considerable time at a temperature approaching the melting point. This aging treatment allows eutectic equilibrium to take place to a large extent. Having natured the product it may then be churned or beaten to further modify the grain and improve the grain and improve the color. By naturing in this manner and subsequently beating the tendency to nature on standing with consequent change in color with acquisition of an undesirable degree of translucency instead of retaining a white opaque appearance, is greatly reduced, while only a small amount of the hydrogenated oil is required to give the requisite consistency, thus affording as nearly as possible a compound consisting mainly of chemically unchanged vegetable oil. For many climates only 8–9% of the hydrogenated oil is required for lard compound of this character and the ingredients combine or incorporate closely by such treatment giving a product which is not "brittle". Using red cotton oil preferably well hydrogenated a yellow butter substitute may be prepared from cottonseed and cocoanut oil by incorporating to make of the consistency of butter and with a melting point so low that the composition does not leave a greasy after sensation in the mouth.

Most oils of a vegetable nature and some animal oils contain from traces up to considerable quantities of highly unsaturated bodies, including those of the linoleic and linolenic group. These and other similar bodies are very sensitive to oxidation and lend instability to such edible oil products of this character by their tendency to change chemically and thus alter the flavor of the material. Some oils proposed or intended for edible purposes contain nitrogeneous or other bodies of a deleterious or toxic character which may be destroyed by certain treatment as by certain conditions of hydrogenation without charging with metal poisons so that the oil or fat becomes safely edible and without cumulative and dangerous effects when taken in large quantities for protracted periods. For a high grade edible product a composition essentially or substantially free from the foregoing objectionable bodies is desired.

This may be accomplished by very careful hydrogenation (especially with a metal catalyzer incapable of solution in the oily body) up to the degree of consistency required in the edible product, but such hydrogenation is difficult to carry out commercially on a large scale with the assurance that the product will run uniform in quantity. Therefore, I prefer to carry out the treatment by saturating these bodies with hydrogen or other harmless additive element or radical so as to cause these bodies to lose their identity and become substantially free of odor and tendency to rancidify or otherwise be decomposed.

By hydrogenating soya bean, cottonseed oil or corn oil or similar oils to materially reduce the iodin number, the more sensitive double bonds are saturated with hydrogen and thereby eliminated and oxidation tendency is reduced to a minimum. Apparently the complete elimination of all the double bond grouping of the linoleic type is more difficult than the removal of the linolenic type, so that control over this seeming selective action during hydrogenation when saturating up to a given degree of consistency from a given oil, is difficult.

If, however, the oil is over-hydrogenated so that a more consistent fat is secured than is actually desired for an edible product, the unstable bodies thus may be completely transformed, that is to say, they are chemically converted into different chemical compounds. By this over or super-hydrogenation the linoleic as well as the linolenic and insolinolenic bodies and the like are substantially completely transformed and other desirable deep seated reactions occur which afford a product possessing useful characteristics. In order to secure the degree of consistency desired I may cool the hot hydrogenated fat gradually to about 30° C. when the temperature may be maintained between 25° to 35° C. or so for several hours to induce crystallization or balling of the high melting point compound. The mass is then pressed in the manner well known in the art. The pressed cake contains the steariness and other high melting bodies produced by hydrogenation.

The oil contains unchanged olein, some hydrogenated bodies, unsaponifiable oils etc. The extracted oil is then preferably bleached using for this purpose fullers' earth, ozone, oxygen and the like. Fish oil preferably should be treated with ozone followed by filtration in a heated condition through fullers' earth. The bleached oil may then be combined with such proportion of the stearin as gives the buttery or lard-like mass desired. Usually one to three parts of the so-called stearin is added, to about 5 parts of the oil. This mixture is preferably chilled and whipped or otherwise agitated in the presence of air or other gas, as nitrogen or pure hydrogen, to give what may be termed a vesiculated mass.

Or, the super hydrogenated product may be pressed at a temperature which eliminates only a portion of the stearin-like bodies and thus affords the consistency required with the completion of the deep seated reaction occuring during hydrogenation under these circumstances. The product of the requisite consistency thus derived may best be bleached with fullers' earth or other bleaching agents or otherwise treated as by blowing with superheated steam at from 150° up to about 315° C. while subjecting the oil or fat material to reduced atmospheric pressure, preferably "pulling" a vacuum of about 29 inches mercury column.

Such a super-hydrogenated pressed product of butter-like and also lard-like consistency or other suitable consistency is obtained from a number of common animal and vegetable oils or mixtures of these possessing a number of desirable properties. Such products when prepared properly without forced hydrogenation at excessively high temperatures are stable in storage and are not liable to coagulate on standing with the formation of objectionable masses of granulous stearin-like bodies. The product is free from objectionable odor and does not acquire any resinous stale taste upon standing for an indefinite period, nor does it resume its original odor on standing.

Fish oil or whale oil may be hydrogenated slightly in excess and then pressed to soft tallow or lard-like consistency and bleached. The fat product will then be found free from fishy odor having a pleasant odor recalling fresh tallow. Scarcely any of the original flavor remains and the very slight tang which is usually apparent generally is not of a disagreeable nature.

Another feature of the present product is that apparently it does not on long standing act upon tin or tin-containers so that oil becomes more or less charged with tin compound. The hydrogenated product made under these circumstances bears a considerable addition of other oils which have not been hydrogenated, or have not been subjected to the action of hydrogen; the hydrogenated product embedding and protecting those other less stable oils from the normally spontaneous reaction or changes which they are well known to frequently experience.

The product may be made capable of standing the relatively high temperature as are incident to many culinary operations without the formation of acrolein fumes and other objectionable bodies.

Another very desirable feature is that of melting point lag or hysteresis, involving a seemingly peculiar lack of immediate response to temperature fluctuations which is often very pronounced and which enables the production of soft edible products not melting easily in hot weather.

Among the vegetable oils corn, cottonseed, soya bean, peanut, sesame, olive, rape, cocoanut, caster and palm oils or animal oils such as those of lard and tallow and other oleins and palmitins with more or less stearins of an animal nature, fish and whale oils, cod-liver oil and the like may be employed either in the hydrogenated or unhydrogenated condition in compounding products under the present invention.

I have noted that when a vegetable oil such as cottonseed oil is hydrogenated directly until of the consistency desired that on cooling it tends frequently to granulate unless chilled or very rapidly cooled. This is objectionable in culinary operations as an initial lard-like body after once heating and slow cooling in the air, often forms relatively hard granules of stearin-like bodies which look like little balls of coagulated material and separating as they do from the fluid oil under some circumstances give the product the appearance of having curdled or decomposed. By super-hydrogenating and pressing to the point required the granulating stearins or stearin-like bodies are eliminated to a greater or less extent and less easily crystallizing or non granulating stiffening bodies remain, tending from their amorphous texture to better maintain substantially the original consistency and appearance of the product in repeated culinary use.

Ordinarily, however, I prefer to secure a product of a consistency expressed as the solidifying point of said product of a range approximately from above 15° C. to below 35° C. It, of course, may vary within still greater limits according to climate and seasonal variations of atmospheric temperature. In general a product having a titer of from 25° C. to 28° C. is well suited as lard substitutes or lard compound. It should be noted that the term titer as herein employed is that not rigidly precise thermometric value derived by cooling some of the melted product (not the fatty acids) and taking the point where the falling thermometric column becomes stationary which is that point where solidification takes place.

For the manufacture of butter substitutes other conditions obtain. A softer product is derived, one in particular which when taken into the mouth immediately melts and does not leave a disagreeable greasy sensation on the tongue and walls of the mouth. In the manufacture of hydrogenated butter substitute as I have set forth in U. S. Letters Patent No. 1,038,545 of Sept. 17, 1912, the step of over or super-hydrogenation is desirable. In the above mentioned patent I have specified in particular the manufacture of a butter substitute involving the incorporation of hydrogenated edible oil with milk material.

It is also possible to make a butter-like composition without the use of milk material, but consisting of simply edible hydrogenated oil with perhaps some flavoring material as valerian ester and the like, salt and coloring matter. The mixture of edible hydrogenated vegetable oil with ordinary butter in a proportion of two parts of the oil to one part of the butter provides very suitable butter-like material at a relatively low cost. Hydrogenated corn oil, because of its flavor is desirable for use in this way.

While the procedure of making an edible butter or lard-like compound varies somewhat depending upon the oils or fats treated and degree of consistency desired, etc., for illustrative purposes, an edible mixture is prepared by taking cottonseed oil and corn oil in the proportion of 4 parts of the former to one part of the latter. The almost tasteless character of cottonseed oil when highly refined and also when hydrogenated is improved by the addition of corn or peanut oil giving the product a faintly nutty flavor. The mixture may be super-hydrogenated by the action of hydrogen in the presence of a catalyzer to a titer of 35° C. to 40° C. This is cooled and pressed to bring the product to a titer of say about 26° C. It is agitated and heated with 5% more or less of fullers' earth for about one hour and after filtration is ready for packaging. Or the pressed super-hydrogenated cottonseed oil product obtained in this way may be mixed with about 15% or 20% of corn oil to secure the titer desired.

I do not limit myself solely to the use of super-hydrogenated oils or similar fatty bodies. Additions in various proportion of the different kinds of oils above mentioned may be made as desired to secure mixtures of hydrogenated and ordinary oils. The defects of ordinary oils when not added in large quantities may be in a measure compensated by the presence of the hydrogenated product and more particularly by a product which has been super-hydrogenated and pressed.

Wherever the terms "oils" and "fats" have been used herein, they are applied as is common in this art in a sense which is substantially synonymous.

In the case of oils containing considerable quantities of fatty acids, I prefer to distil these with steam under reduced atmospheric pressure, to remove the deleterious acid material, leaving the fatty mixed esters in substantially pure condition and in form readily susceptible to the action of hydrogen.

By the present invention cocoanut oil may be used as a blending material and may be hydrogenated or not according to circumstances.

Hydrogenated fish or whale oil similarly may be used as a basis of moisture-containing or dry butter substitutes and other edible products. Before treating crude oil of this character with hydrogen, it preferably should be washed with dilute alkali to remove free fatty acids.

Hydrogenation progresses somewhat more easily with neutral oils than with those containing large amounts of free fatty acids and less metal is dissolved from the catalyzer by the oil when the latter is neutral.

The treating receptacles in which hydrogenation is carried on preferably should be lined with enamel or nickel or some material which has no anticatalytic action.

For making edible products metallic iron is oftentimes unsuitable for use when the catalyzer comes in contact with it, usually having a repressing action on the activity of the catalyzer and sometimes tending to discolor the edible oil.

In the preparation of oils or solid fats for edible purposes such for example as so-called vegetable lard, it is desirable usually to prepare a product having a constant melting point; that is each lot of the product should have approximately the same melting point. This may be accomplished by having on hand a quantity of oil which has been under-hydrogenated so that the product issuing from the apparatus may be mixed with more or less of either of the preparations, in order to modify the melting point and render it uniform. In case an oil has been over-hydrogenated, and is too hard, it is not usually desirable to add to it some of the original oil, because the latter has not been deodorized by hydrogenation, and therefore imparts an undesirable odor or flavor to the product. It is better, as above stated, to add a partially hydrogenated oil, free from these objections.

In the hydrogenation low pressure should be employed, thereby forming products free from lactones.

The super-hydrogenation of fish oil converts the esters of the series of fatty acids $CnH_2n-8O_2$ into comparatively odorless saturated compounds. Glyceryl clupanodonate, a body largely responsible for the disagreeable odor of fish oil, is converted into the stearate and the latter may be removed more or less by pressing or otherwise. The resinous substances apparently formed by the oxidation of clupanodonic acid, when fish oil is exposed to the air for a considerable period, are not as easily eliminated by hydrogenation and their presence in quantity is not conducive to effective action of some catalyzers. When present in any material proportion the oil should be washed with an alkaline solution prior to hydrogenation.

Very desirable compositions for use as, or in preparing butter or lard compounds are prepared by incorporating a viscous or syrupy hydrogenated oil or fat with a more readily granulating hydrogenated oil or fat. A body or viscosity is thus imparted to the latter which not only usually improves the melting point hysteresis, but also retards or entirely suppresses spontaneous granulation. Such a viscous or syrupy product may be derived, for example by moderately hydrogenating refined corn oil, especially if carried out without violent churning, as by the quiet hydrogenation which may be secured under the process of U. S. Letters Patent No. 1,026,156 of May 4, 1912. One part more or less of this syrupy fat for example, may be combined with 2 or 3 parts of hydrogenated cotton seed oil to yield a lard substitute of excellent consistency; or the proportions may be reversed to give a major proportion of the syrupy fat in which case the product is better adapted as a butter substitute, especially when combined with milk material.

It is sometimes desirable to make a fat composition or lard-like consistency by mixing hydrogenated oil of a high titer with deodorized cottonseed oil. To this end I hydrogenate cottonseed oil to a fatty acid titer of say 52 and preferably mix with refined deodorized cottonseed oil. When the entire mixture is deodorized by treating with super-heated steam at a temperature of about 400° F. and under a vacuum of about 28 to 29 inches of mercury 20% of the 52 titer oil or fat suffices for making the product aforesaid except in regions subject to the extreme fluctuations of temperature.

In making edible compounds as by mixing hydrogenated linseed oil with refined corn or cotton oil to stiffen the latter to the consistency of lard or butter as the case may be, one may take 6–7 parts of cotton oil to one part of well hardened hydrogenated oil, heat and thoroughly incorporate then run on to a chill roll and aerate by a picker, then run into a storage trough and allow to nature and when natured to a considerable degree of translucency the fat may then again be run through a picker to aerate and give a more permanent opacity than otherwise could be obtained.

What I claim is:

1. An edible oil material of substantially lard-like to butter-like consistency, comprising a slightly hydrogenated liquid oil of a syrupy consistency, mixed with a more highly hydrogenated and substantially harder oil material.

2. A hydrogenated vegetable oil substantially free from lactones.

3. An edible fatty material comprising a soft hydrogenated fatty oil and a relatively hard hydrogenated vegetable oil.

4. A mixture comprising about 1 part of hydrogenated oil, whose titer is above 50° C., and about 4 parts of refined deodorized cotton seed oil.

5. A mixture containing at least 20% of hydrogenated oil whose titer is about 50° C. admixed with nut oil material.

6. A mixture containing at least 20% of hydrogenated oil whose titer is about 50° C. admixed with fatty oil.

7. A product of lard-like consistency, which comprises a chilled, aerated, color-stable, opaque mixture of (a) a hydrogenated fatty oil, whose titer is above 50° C., intimately mixed with (b) a natural fatty material, said product being substantially without action on metallic tin, and being free from vegetable odor capable of indicating its origin, and free from nickel compounds.

8. A hydrogenated oil mixture, comprising an intimate mixture of super-hydrogenated oil and under-hydrogenated oil, aerated sufficiently to produce a whitish opaque material, said product being free from linolenic compounds and from nickel-organic compounds, and substantially without action on tinned containers.

9. A mixture comprising oil hydrogenated to above the desired melting point, mixed with such an amount of slightly hydrogenated and purified oil as to produce the desired melting point.

In testimony whereof I affix my signature.

CARLETON ELLIS.